(12) United States Patent
Liu

(10) Patent No.: US 11,323,936 B2
(45) Date of Patent: May 3, 2022

(54) SERVICE-BASED PROCESSING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/900,686

(22) Filed: Jun. 12, 2020

(65) Prior Publication Data

US 2020/0305048 A1    Sep. 24, 2020

Related U.S. Application Data

(63) Continuation of application No. PCT/CN2018/072253, filed on Jan. 11, 2018.

(51) Int. Cl.
*H04W 8/24* (2009.01)
*H04W 36/14* (2009.01)
*H04W 36/00* (2009.01)
*H04W 48/08* (2009.01)

(52) U.S. Cl.
CPC ............. *H04W 36/14* (2013.01); *H04W 8/24* (2013.01); *H04W 36/0022* (2013.01); *H04W 48/08* (2013.01)

(58) Field of Classification Search
CPC ... H04W 36/14; H04W 36/0022; H04W 8/24; H04W 48/08
See application file for complete search history.

(56) References Cited

U.S. PATENT DOCUMENTS

| | | | |
|---|---|---|---|
| 8,761,138 B2 | 6/2014 | Moisanen | |
| 8,811,936 B2 | 8/2014 | Wu | |
| 9,049,609 B1* | 6/2015 | Reeves | H04W 24/02 |
| 9,565,546 B2 | 2/2017 | Telang et al. | |
| 9,699,718 B2 | 7/2017 | Ramachandran | |
| 10,980,021 B2* | 4/2021 | Lee | H04L 5/0055 |

(Continued)

FOREIGN PATENT DOCUMENTS

| | | |
|---|---|---|
| CN | 101808388 A | 8/2010 |
| CN | 102415138 A | 4/2012 |

(Continued)

OTHER PUBLICATIONS

International Search Report in the international application No. PCT/CN2018/072253, dated Sep. 13, 2018.

(Continued)

*Primary Examiner* — Jay P Patel
(74) *Attorney, Agent, or Firm* — Perkins Coie LLP

(57) ABSTRACT

A service-based processing method, a terminal device, a network device, and a computer storage medium are provided. The method comprises: when a terminal device camps on an NR network, on the basis of capability information reported to a network side and/or indication information sent from the network side, determining whether to select, when initiating a target service, other systems or other domains to initiate a service request for the target service.

16 Claims, 2 Drawing Sheets

```
                                                    ___ 201
┌─────────────────────────────────────────────────────────┐
│ When a terminal device resides in an NR network, the    │
│ terminal device reports to a network side capability    │
│ information for indicating that the terminal device     │
│ supports fallback to another system                     │
└─────────────────────────────────────────────────────────┘
                            │
                            ▼                       ___ 202
┌─────────────────────────────────────────────────────────┐
│ When the network side does not support fallback to the  │
│ another system, the terminal device receives from the   │
│ network side indication information for indicating that │
│ another system or another domain may be directly        │
│ selected by the terminal device to initiate a target    │
│ service                                                 │
└─────────────────────────────────────────────────────────┘
                            │
                            ▼                       ___ 203
┌─────────────────────────────────────────────────────────┐
│ When the terminal device receives the indication        │
│ information sent by the network side, the terminal      │
│ device selects the another system or another domain     │
│ to initiate a service request in condition that the     │
│ related service is initiated                            │
└─────────────────────────────────────────────────────────┘
```

(56) References Cited

U.S. PATENT DOCUMENTS

| | | | |
|---|---|---|---|
| 2010/0265914 A1* | 10/2010 | Song | H04W 36/0022 370/331 |
| 2010/0316000 A1* | 12/2010 | Burbidge | H04W 68/02 370/328 |
| 2011/0028120 A1 | 2/2011 | Wu | |
| 2011/0194505 A1* | 8/2011 | Faccin | H04W 48/18 370/329 |
| 2011/0249624 A1 | 10/2011 | Ramachandran | |
| 2011/0249650 A1* | 10/2011 | Seppanen | H04L 65/1083 370/331 |
| 2012/0113982 A1 | 5/2012 | Akselin | |
| 2012/0115489 A1* | 5/2012 | Shuai | H04W 36/14 455/438 |
| 2012/0157100 A1* | 6/2012 | Suzuki | H01L 31/0525 455/435.2 |
| 2013/0136115 A1 | 5/2013 | Moisanen | |
| 2013/0242765 A1* | 9/2013 | Kubota | H04L 63/123 370/252 |
| 2014/0016614 A1* | 1/2014 | Velev | H04W 36/165 370/331 |
| 2014/0051443 A1* | 2/2014 | Diachina | H04W 36/0022 455/436 |
| 2014/0348064 A1* | 11/2014 | Jeong | H04W 36/0022 370/328 |
| 2015/0036611 A1* | 2/2015 | Kim | H04W 36/0022 370/329 |
| 2015/0087308 A1* | 3/2015 | Jeong | H04W 36/0022 455/436 |
| 2016/0057661 A1 | 2/2016 | Nayak et al. | |
| 2016/0227447 A1* | 8/2016 | Hu | H04W 36/0022 |
| 2016/0262004 A1 | 9/2016 | Telang et al. | |
| 2016/0262058 A1* | 9/2016 | Jeong | H04W 4/025 |
| 2016/0309439 A1* | 10/2016 | Wu | H04W 60/005 |
| 2016/0337928 A1* | 11/2016 | Yang | H04W 36/0022 |
| 2016/0360457 A1* | 12/2016 | Yang | H04W 36/14 |
| 2017/0374600 A1* | 12/2017 | Lantz | H04L 65/1069 |
| 2018/0007626 A1* | 1/2018 | Tenny | H04W 68/02 |
| 2018/0020382 A1* | 1/2018 | Kim | H04W 8/22 |
| 2018/0132141 A1* | 5/2018 | Huang-Fu | H04W 36/0022 |
| 2018/0152865 A1* | 5/2018 | Atri | H04W 36/30 |
| 2018/0227219 A1* | 8/2018 | Zhang | H04L 45/22 |
| 2018/0376384 A1* | 12/2018 | Youn | H04W 36/14 |
| 2019/0037417 A1* | 1/2019 | Lei | H04W 72/085 |
| 2019/0053160 A1* | 2/2019 | He | H04W 52/0206 |
| 2019/0124124 A1* | 4/2019 | Chong | H04W 12/06 |
| 2019/0124561 A1* | 4/2019 | Faccin | H04W 48/18 |
| 2019/0132782 A1* | 5/2019 | Kim | H04W 36/08 |
| 2019/0159074 A1* | 5/2019 | Velev | H04W 76/27 |
| 2019/0166576 A1* | 5/2019 | Kim | H04W 36/08 |
| 2019/0191349 A1* | 6/2019 | Kim | H04W 76/18 |
| 2019/0208393 A1* | 7/2019 | Bakker | H04L 65/1006 |
| 2019/0223205 A1* | 7/2019 | Papasakellariou | H04L 5/0048 |
| 2019/0246445 A1* | 8/2019 | Centonza | H04W 76/27 |
| 2019/0306728 A1* | 10/2019 | Lei | H04W 16/32 |
| 2019/0319686 A1* | 10/2019 | Chen, IV | H04B 7/088 |
| 2019/0394625 A1* | 12/2019 | Kim | H04W 4/40 |
| 2020/0015128 A1* | 1/2020 | Stojanovski | H04W 36/0022 |
| 2020/0214065 A1* | 7/2020 | Tomala | H04W 76/15 |
| 2020/0221290 A1* | 7/2020 | Wiemann | H04L 5/0091 |
| 2020/0229069 A1* | 7/2020 | Chun | H04W 36/0079 |
| 2020/0252849 A1* | 8/2020 | Tang | H04W 36/0022 |
| 2020/0260414 A1* | 8/2020 | Song | H04L 5/0092 |
| 2020/0275337 A1* | 8/2020 | Liu | H04W 36/0044 |
| 2020/0280836 A1* | 9/2020 | Velev | H04W 8/12 |
| 2020/0288367 A1* | 9/2020 | Kim | H04W 36/00 |
| 2020/0314820 A1* | 10/2020 | Kim | H04W 72/0453 |
| 2020/0329408 A1* | 10/2020 | Selvaganapathy | H04L 45/306 |
| 2020/0336885 A1* | 10/2020 | Schliwa-Bertling | H04W 4/12 |
| 2020/0389912 A1* | 12/2020 | Baldemair | H04W 72/1278 |
| 2020/0403751 A1* | 12/2020 | Baldemair | H04L 1/0027 |
| 2021/0029618 A1* | 1/2021 | Jain | H04W 48/16 |

FOREIGN PATENT DOCUMENTS

| | | | | |
|---|---|---|---|---|
| CN | 102439943 | A | 5/2012 | |
| CN | 102893673 | A | 1/2013 | |
| CN | 104982081 | A | 10/2015 | |
| CN | 106797294 | A | 5/2017 | |
| CN | 107409302 | A | 11/2017 | |
| EP | 2422553 | A1 | 2/2012 | |
| EP | 2806694 | A1 * | 11/2014 | H04W 48/20 |
| RU | 2518414 | C2 | 6/2014 | |
| WO | 2011006440 | A1 | 1/2011 | |
| WO | 2013080098 | A1 | 6/2013 | |
| WO | 2016028570 | A1 | 2/2016 | |
| WO | WO-2018232560 | A1 * | 12/2018 | H04W 36/0079 |

OTHER PUBLICATIONS

Motorola Mobility et al: "OI#11-EPC fallback and handling of 5GC services in DR-mode of operation", 3GPP Draft; S2-177679 WAS7571 23501 Drmode EPC-Fallbac K_V02, 3rd Generation Partnership Project (3GPP), Mobile Competence Centre; 650, Route Des Lucioles; F-06921 Sophia-Antipolis Cedex France vol. SA WG2, no. Ljubljana, Slovenia; Oct. 23, 2017-Oct. 27, 2017 Oct. 30, 2017 (Oct. 30, 2017), XP051360332, [retrieved on Oct. 30, 2017] * pp. 1,2 *.
Anonymous: 3rd Generation Partnership Project; Technical Specification Group Services and System Aspects; System Architecture for the 5G System; Stage 2 (Release 15) 3GPP Standard: Technical Specification; 3GPP TS 23.501, 3rd Generation Partnership Project (3GPP), Mobile Competence Centre 650, Route Des Lucioles; F-06921 Sophia-Antipolis Cedex: France, vol. SA WG2, No. V15.0.0, Dec. 22, 2017 (Dec. 22, 2017), pp. 1-181, XP051392101, [retrieved on Dec. 22, 2017] * p. 124 *.
Nokia et al: "TS 23.501: Voice and emergency session support for 5G", 3GPP Draft; S2-173417 5G OPT-2 and EMER-V4, 3rd Generation Partnership Project (3GPP), Mobile Competence Centre; 650, Route Des Lucioles: F-06921 Sophia-Antipolis Cedex: France vol. SA WG2, no. Hangzhou, China; May 15, 2017-May 19, 2017 May 14, 2017 (May 14, 2017), XP051281909, Retrieved from the Internet: URL: http://www.3gpp.org/ftp/Meetings_3GPP_SYNC/SA2/Docs/[retrieved on May 14, 2017] * pp. 1-3-col. 1 *.
Supplementary European Search Report in the European application No. 18900521.8, dated Oct. 8, 2020.
SA WG2 Meeting #122 S2-174550, Jun. 26-30, 2017, San Jose Del Cabo, Mexico (revision of S2-17xxxx), Source: Intel, Samsung; Title: EPS fallback; Document for: Approval; Agenda Item: 6.5.9.
3GPP TSG-RAN WG2 #100 R2-1712537, Reno, Nevada, USA, Nov. 27-Dec. 1, 2017 (Revision of R2-1710484), Agenda Item: 10.4.4.4; Source: Ericsson; Title: Service-based RAT/frequency selection in INACTIVE or in IDLE.
SA WG2 Meeting #123 S2-178184, Oct. 23-27, 2017, Ljubljana, Slovenia (e-mail revision 5 of S2-176891)Source: Nokia, Nokia Shanghai Bell (Rapporteur); Title: TS 23.501: Editorial corrections and alignment; Document for Approval; Agenda Item: 6.5.1.
Feng Rongzhou, TD-LTE Network Interoperability Strategy Analysis, <Guangdong Communication Technology > DOI: 10.3969, issued on Jan. 15, 2016.
First Office Action of the Russian application No. 2020124280, dated Mar. 19, 2021.
First Office Action of the Chinese application No. 202010388524.8, dated May 24, 2021.
First Office Action of the European application No. 18900521.8, dated Jul. 8, 2021. 8 pages.
First Office Action of the Canadian application No. 3,088,216, dated Aug. 4, 2021. 3 pages.
First Office Action of the Indian application No. 202017033577, dated Aug. 11, 2021. 5 pages with English translation.
Second Office Action of the Chinese application No. 202010388524.8, dated Sep. 18, 2021. 11 pages with English translation.
Second Office Action of the European application No. 18900521.8, dated Jan. 4, 2022. 7 pages.

(56) References Cited

OTHER PUBLICATIONS

3GPP TS 23.501 V2.0.1 (Dec. 2017), 3rd Generation Partnership Project; Technical Specification Group Services and System Aspects; System Architecture for the 5G System; Stage 2(Release 15). 183 pages.
First Office Action of the Korean application No. 10-2020-7020173, dated Oct. 21, 2021. 10 pages with English translation.
Huawei, China Mobile, China Unicom, CATT, Iu-CS based CS fallback architecture, 3GPP TSG-SA WG2#63 S2-081755, <http://www.3gpp.org/ftp/tsg_sa/WG2_Arch/TSGS2_63_Athens/Docs/S2-081755. zip>, Feb. 22, 2008. 17 pages.
First Office Action of the Japanese application No. 2020-538080, dated Nov. 16, 2021. 6 pages with English translation.
Decision of Refusal of the Chinese application No. 202010388524.8, dated Dec. 17, 2021. 11 pages with English translation.

\* cited by examiner

SERVICE-BASED PROCESSING METHOD, TERMINAL DEVICE, AND NETWORK DEVICE

CROSS REFERENCE TO RELATED APPLICATION

This application is a continuation of International Patent Application No. PCT/CN2018/072253 filed on Jan. 11, 2018, the disclosure of which is hereby incorporated by reference in its entirety.

BACKGROUND

When a network supports a voice service (including emergency call voice, hereinafter a voice service for short), the network may send indication information of supporting the voice service to a terminal device. If the network does not directly support the voice service but supports fallback to another system, the network may indicate to the terminal that fallback to the other system is supported by the network side. If the network neither supports the voice service, nor supports fallback to another system, the problem that a behavior of the terminal is unclear may arise.

SUMMARY

The disclosure relates to the technical field of information processing. For solving the technical problem, embodiments of the disclosure provide a service-based processing method, a terminal device, a network device and a computer storage medium.

The embodiments of the disclosure provide a service-based processing method, which may be applied to a terminal device and include the following operation.

When the terminal device resides in a New Radio (NR) network, whether to select another system or another domain to initiate a service request for a target service upon initiation of the target service is determined based on capability information reported to a network side and/or based on indication transmitted by the network side.

The embodiments of the disclosure provide a service-based processing method, which may be applied to a network device and include the following operation.

When a terminal device resides in an NR network, indication is transmitted to the terminal device.

The embodiments of the disclosure provide a terminal device, which may include a first communication unit and a first processing unit.

The first communication unit is configured to report capability information to a network side and/or receive indication transmitted by the network side.

The first processing unit is configured to, when the terminal device resides in an NR network, determine whether to select another system another domain to initiate a service request for a target service when the target service is initiated, based on the capability information reported to the network side and/or based on the indication transmitted by the network side.

The embodiments of the disclosure provide a network device, which may include a second processing unit and a second communication unit.

The second processing unit is configured to, when a terminal device resides in an NR network, transmit indication to the terminal device through the second communication unit.

The second communication unit is configured to send the indication to the terminal device.

The embodiments of the disclosure provide a terminal device, which may include a processor and a memory configured to store a computer program capable of running in the processor.

The processor may be configured to run the computer program to execute the steps of the abovementioned method.

The embodiments of the disclosure provide a network device, which may include a processor and a memory configured to store a computer program capable of running in the processor.

The processor may be configured to run the computer program to execute the steps of the abovementioned method.

The embodiments of the disclosure provide a computer storage medium, which may store computer-executable instructions, the computer-executable instructions being executed to implement the steps of the abovementioned methods.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Embodiment 1

The embodiment of the disclosure provides a service-based processing method, which is applied to a terminal device and includes the following operation.

When the terminal device resides in an NR network, whether to select another system or another domain to initiate a service request for a target service upon initiation of the target service is determined by the terminal device based on capability information reported to a network side and/or based on indication transmitted by the network side.

Specifically, the capability information is at least used for indicating whether the terminal device supports a capability of fallback to the another system or the another domain.

The indication transmitted by the network side includes indication information for indicating whether the network side supports the target service or indication information for indicating whether the network side supports fallback of the target service.

The another system is one of at least one system except the NR network. For example, it may be a system network such as a Long Term Evolution (LTE) network and a 5th-Generation (5G), 4th-Generation (4G) or 3rd-Generation (3G) network. Exhaustions are omitted herein.

The other domain is a domain different from a present domain used by the terminal device, and includes a Circuit Switched (CS) domain or a Packet Switched (PS) domain.

It is also to be understood that the present domain used by the terminal device may be one of the CS domain or the PS domain and, correspondingly, the another domain is a domain except the presently used domain. That is, the above processing further includes that a subsequent operation is executed when the terminal device resides in the NR system and a target domain is selected.

Furthermore, the operation that whether to select the another system or the another domain to initiate the service request for the target service upon initiation of the target service is determined based on the capability information reported to the network side and/or based on the indication transmitted by the network side may include the following multiple implementation scenarios.

A First Scenario

When the capability information of the terminal device represents that the terminal device does not support fallback to the another system or the another domain and the received indication information from the network side represents that the network side supports fallback of the target service to the another system or the another domain, the terminal device selects the another system or the another domain to initiate the service request for the target service.

Figure 1:
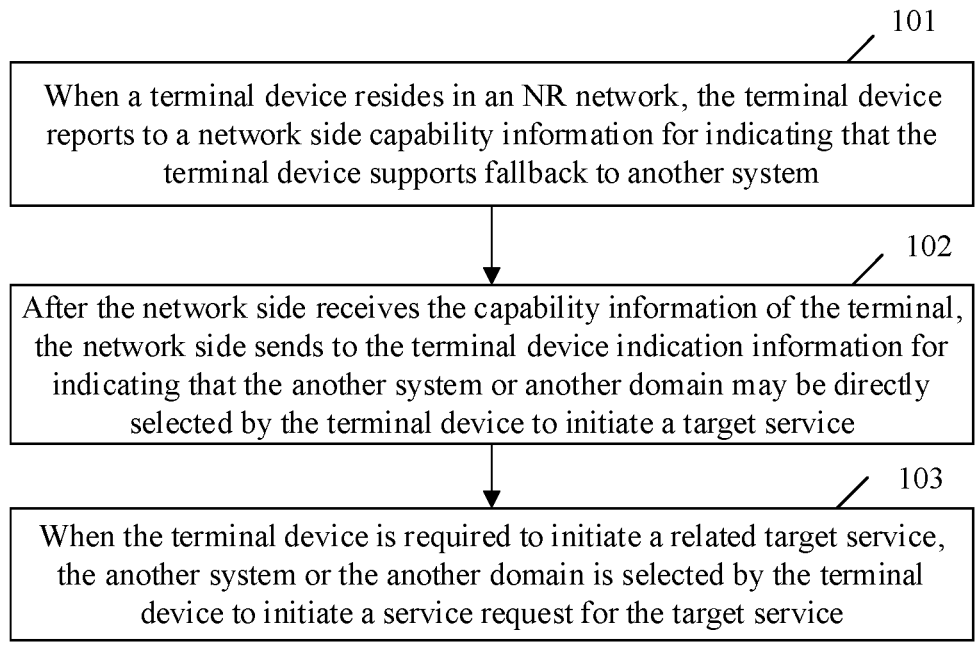
FIG. 1 is a first flowchart of a service-based processing method according to an embodiment of the disclosure.

The scenario may be described with reference to FIG. 1. The following steps are included.

In 101, when a terminal device resides in an NR network, the terminal device reports to a network side capability information for indicating that fallback to another system is not supported by the terminal device.

In 102, after the network side receives the capability information of the terminal, the network side sends to the terminal device indication information for indicating that the another system or another domain may be directly selected by the terminal device to initiate a target service.

In 103, when the terminal device requires to initiate a related target service, the another system or the another domain is selected by the terminal device to initiate a service request for the target service.

A Second Scenario

When the capability information of the terminal device represents that the terminal device supports the capability of fallback to the other system or the other domain and the indication transmitted by the network side represents that fallback of the target service to the another system or the another domain is not supported by the network side, or the indication transmitted by the network side is not received by the terminal device, the terminal device selects the another system or the another domain to initiate the service request for the target service.

Specifically, when the terminal resides in the NR network, if the terminal device notifies the network side that it supports fallback to the another system or the another domain, but the indication transmitted by the network side represents that the network side does not support fallback to the another system or the another domain, the terminal device selects the another system or the another domain to initiate the service request for the target service.

Or, when the terminal resides in the NR network, if the terminal device notifies the network side that it supports fallback to the another system or the another domain, but does not receive the indication information transmitted by the network side, the terminal device selects the another system or the another domain to initiate the service request for the target service.

A Third Scenario

When the indication transmitted by the network side for representing that the network side supports fallback of the target service to the another system or the another domain is not received by the terminal device, or indication transmitted by the network side for representing that the network side supports the target service is not received by the terminal device, the terminal device selects the another system or the another domain to initiate the service request for the target service.

Specifically, when the terminal resides in the NR network, if the terminal does not receive an indication for indicating that the network side supports the service or the indication for indicating that the network side supports fallback of the service from the network, when initiation of the related service is required, the terminal device selects the another system or another domain to initiate the service request.

A Fourth Scenario

When the capability information of the terminal device represents that the terminal device supports fallback to the another system or the another domain, if indication information for instructing the terminal device to directly select the another system or the another domain to initiate the service request for the target service is received from the network side, the terminal device selects the another system or the another domain to initiate the service request for the target service.

Figure 2:
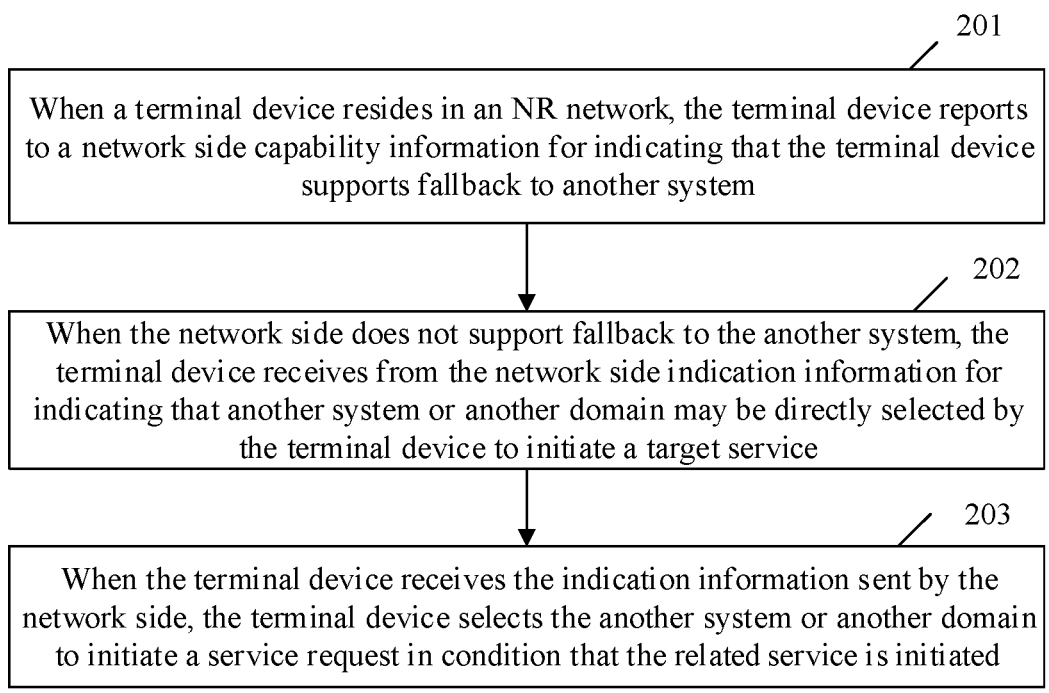
FIG. 2 is second first flowchart of a service-based processing method according to an embodiment of the disclosure.

For example, referring to FIG. 2, the following steps are included.

In 201, when a terminal device resides in an NR network, the terminal device reports capability information for indicating that the terminal device supports fallback to another system to a network side.

In 202, when the network side does not support fallback to the another system, the terminal device receives indication transmitted by the network side for indicating that the another system or another domain may be directly selected to initiate a service.

In 203, when the terminal device receives the indication information sent by the network side and needs to initiate the related service, the terminal device selects the another system or another domain to initiate a service request.

A Fifth Scenario

When the indication transmitted by the network side is received, if the terminal device is incapable of parsing the indication or the indication represents that fallback of the target service to the another system or the another domain is not supported by the network side, the terminal device selects the another system or the another domain to initiate the service request for the target service.

When the indication transmitted by the network side for representing that the network side supports fallback of the target service is received by the terminal device, if the terminal device is incapable of parsing the indication or the terminal device does not support fallback of the service to another network or another system, the terminal device selects the another system or the another domain to initiate the service request for the target service.

That is, when the terminal resides in the NR network, if the terminal receives the indication information for indicating that the network side supports fallback of the service from the network, but the terminal cannot understand the indication information or the terminal does not support fallback of the service to the another network or another system, when the related service is required to be initiated, the terminal device selects the another system or another domain to initiate the service request.

Or, when the terminal resides in the NR network, if the indication received by the terminal from the network represents that the network side does not support fallback of the target service to the another system or the another domain, the terminal device selects the another system or the another domain to initiate the service request for the target service.

It can be seen that, with adoption of the solution, when the service request is initiated, whether to select another system or another domain may be determined by the terminal device according to its own capability information and/or an indication transmitted by the network side. In such a manner, the terminal device may determine its own behavior in combination with the capability of the terminal device and the indication of a network, so that a processing behavior of the terminal device for the target service may be clearly learned if the network side does not support a voice service and also does not support fallback to another system.

Embodiment 2

The embodiment of the disclosure provides a service-based processing method, which is applied to a network device and includes the following operation.

When a terminal device resides in an NR network, indication information is transmitted to the terminal device.

Specifically, the capability information is at least used for indicating whether the terminal device supports fallback to another system or another domain.

The indication transmitted by the network side includes an indication for indicating whether the network side supports the target service or an indication for indicating whether the network side supports fallback of the target service to another system or another domain.

The another system is one of at least one system except the NR network. For example, it may be a system network such as an LTE network and a 5G, 4G or 3G network. Exhaustions are omitted herein.

The another domain is a domain different from a present domain used by the terminal device, and includes a CS domain or a PS domain.

It is also to be understood that the present domain used by the terminal device may be one of the CS domain or the PS domain and, correspondingly, the another domain is a domain except the presently used domain. That is, the above processing further includes that a subsequent operation is executed when the terminal device resides in the NR system and a target domain is selected by the terminal device.

Furthermore, before the operation that the indication information is transmitted to the terminal device, the method further includes the following operation.

The capability information of the terminal device is received by the network device, the capability information being at least configured to indicate whether the terminal device supports fallback to another system or another domain.

The operation that whether to select another system or another domain to initiate the service request for the target service upon initiation of the target service is determined by the terminal device based on the capability information reported to the network side and/or based on the indication transmitted by the network side may include the following multiple implementation scenarios.

A First Scenario

The scenario may be described with reference to FIG. 1. The following steps are included.

In 101, when a terminal device resides in an NR network, the terminal device reports to a network side capability information for indicating that the terminal device does not support fallback to another system.

In 102, after the network side receives the capability information of the terminal, the network side sends to the terminal device indication for indicating that another system or another domain may be directly selected by the terminal device to initiate a target service.

In 103, when the terminal device is required to initiate a related target service, the terminal device selects the another system or the another domain to initiate a service request for the target service.

A Second Scenario

When the terminal resides in the NR network, if the terminal device notifies the network side that it supports fallback to the another system or another domain, but the indication transmitted by the network side represents that the network side does not support fallback to the another system or another domain, the terminal device selects the another system or another domain to initiate the service request for the target service.

When the terminal resides in the NR network, if the terminal device notifies the network side that it supports fallback to the another system or another domain, but does not receive indication transmitted by the network side, the terminal device selects the another system or another domain to initiate the service request for the target service.

A Third Scenario

When the terminal resides in the NR network, if the terminal does not receive an indication about that the network supports the service or the indication about that the network supports fallback of the service from the network, when the related service is required to be initiated, the terminal device selects the another system or domain to initiate the service request.

A Fourth Scenario

Referring to FIG. 2, the following steps are included.

In 201, when a terminal device resides in an NR network, the terminal device reports to a network side capability information for indicating that fallback to another system is supported.

In 202, when the network side does not support fallback to the another system, the terminal device receives indication for indicating that the another system or another domain may be directly selected by the terminal device to initiate a service from the network side.

In 203, After the terminal device receives the indication from the network side, when initiation of the related service is required, the terminal device selects the another system or another domain to initiate a service request.

A Fifth Scenario

When the terminal resides in the NR network, if the terminal receives the indication for indicating that the network supports fallback of the service from the network, but the terminal may not understand the indication or the terminal does not support fallback of the service to another network or system, when the related service is required to be initiated, the terminal device selects the another system or another domain to initiate the service request.

Or, when the terminal resides in the NR network, if the indication received by the terminal from the network represents that fallback of the target service to the another system or the another domain is not supported by the network, the terminal device selects the another system or the another domain to initiate the service request for the target service.

It can be seen that, with adoption of the solution, when the service request is initiated, whether to select the other system or the other domain may be determined by the terminal device according to its own capability information and/or an indication transmitted by the network side. In such a manner, the terminal device may determine its own behavior in combination with the capability of the terminal device and the indication of a network, so that a processing behavior of the terminal device for the target service may be clearly learned if the network side does not support a voice service and also does not support fallback to another system.

Embodiment 3

Figure 3:
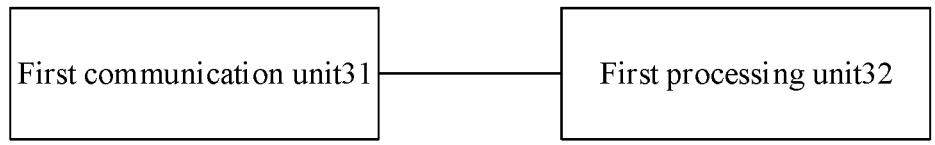
FIG. 3 is a composition structure diagram of a terminal device according to an embodiment of the disclosure.

The embodiment of the disclosure provides a terminal device, which, as shown in FIG. 3, includes a first communication unit 31 and a first processing unit 32.

The first communication unit 31 is configured to report capability information to a network side and/or receive indication transmitted by the network side.

The first processing unit 32 is configured to, when the terminal device resides in an NR network, determine, when the target service is initiated, whether to select another system or another domain to initiate a service request for a target service, based on the capability information reported to the network side and/or based on the indication transmitted by the network side.

Specifically, the capability information is at least used for indicating whether the terminal device supports a capability of fallback to the another system or the another domain.

The indication information transmitted by the network side includes indication for indicating whether the network side supports the target service or indication for indicating whether the network side supports fallback of the target service.

The another system is one of at least one system except the NR network. For example, it may be another system network such as an LTE network and a 5G, 4G or 3G network. Exhaustions are omitted herein.

The other domain is a domain different from a present domain used by the terminal device, and includes a CS domain or a PS domain.

It is also to be understood that the present domain used by the terminal device may be one of the CS domain or the PS domain and, correspondingly, the another domain is a domain except the presently used domain. That is, the above processing further includes that a subsequent operation is executed when the terminal device resides in the NR system and after a target domain is selected.

Furthermore, the operation that whether to select the another system or the another domain to initiate the service request for the target service upon initiation of the target service is determined by the terminal device based on the capability information reported to the network side and/or based on the indication transmitted by the network side may include the following multiple implementation scenarios.

A First Scenario

The first processing unit 32 is configured to, when the capability information reported to the network side represents that the terminal device does not support fallback to another system or another domain and the received indication information transmitted by the network side represents that fallback of the target service to the another system or the another domain is supported, select, by the terminal device, the another system or the another domain to initiate the service request for the target service.

The scenario may include the following operations: when a terminal device resides in an NR network, the terminal device reports capability information indicating that fallback to another system is not supported to a network side; after the network side receives the capability information of the terminal, the network side sends indication information indicating that the another system or another domain may be directly selected by the terminal device to initiate a target service to the terminal device; and when the terminal device requires to initiate the related target service, the terminal device selects the another system or the another domain to initiate a service request for the target service.

A Second Scenario

The first processing unit 32 is configured to, when the capability information of the terminal device represents that the terminal device supports fallback to another system or another domain, and the received indication from the network side represents that fallback of the target service to the another system or the another domain is not supported or the indication transmitted by the network side is not received by the terminal device, select, by the terminal device, the another system or the another domain to initiate the service request for the target service.

Specifically, when the terminal resides in the NR network, if the terminal device notifies the network side that it supports fallback to the another system or the another domain, but the indication transmitted by the network side represents that the network side does not support fallback to the another system or the another domain, the terminal device selects the another system or the another domain to initiate the service request for the target service.

Or, when the terminal resides in the NR network, if the terminal device notifies the network side that it supports fallback to the another system or the another domain but does not receive the indication transmitted by the network side, the terminal device selects the another system or the another domain to initiate the service request for the target service.

A Third Scenario

The first processing unit 32 is configured to, when the indication transmitted by the network side for representing that the network side supports fallback of the target service to another system or another domain is not received, or indication transmitted by the network side for representing that the target service is supported is not received, select, by the terminal device, the another system or the another domain to initiate the service request for the target service.

Specifically, when the terminal resides in the NR network, if the terminal does not receive an indication about that the service is supported or the indication indicating that fallback of the service is supported from the network, when the related service is required to be initiated, the terminal device selects the another system or domain to initiate the service request.

A Fourth Scenario

The first processing unit 32 is configured to, when the capability information of the terminal device represents that the terminal device supports fallback to another system or another domain, if indication information for instructing the terminal device to directly select the another system or the another domain to initiate the service request for the target service is received from the network side, select, by the terminal device, the another system or the another domain to initiate the service request for the target service.

For example, the following operations are included: when a terminal device resides in an NR network, the terminal device reports capability information indicating that fallback to another system is supported to a network side; when the network side does not support fallback to the another system, the terminal device receives indication for indicating that the another system or another domain may be directly selected by the terminal device to initiate a service from the network side; and when the terminal device receives the indication sent by the network side, when it is required to initiate the related service, the terminal device selects the another system or another domain to initiate a service request.

A Fifth Scenario

The first processing unit 32 is configured to, when the indication transmitted by the network side is received, if the terminal device is incapable of parsing the indication or the indication represents that fallback of the target service to another system or another domain is not supported, select, by the terminal device, the another system or the another domain to initiate the service request for the target service, and, when the indication for representing that fallback of the target service is supported is received from the network side, if the terminal device is incapable of parsing the indication or the terminal device does not support fallback of the service to another network or system, select, by the terminal device, the other system or the other domain to initiate the service request for the target service.

That is, when the terminal resides in the NR network, if the terminal receives the indication indicating that fallback of the service is supported from the network, but the terminal may not understand the indication or the terminal does not support fallback of the service to the another network or system, when the related service is required to be initiated, the terminal device selects the another system or domain to initiate the service request.

Or, when the terminal resides in the NR network, if the indication received by the terminal from the network represents that fallback of the target service to the another system or the another domain is not supported, the terminal device selects the another system or another domain to initiate the service request for the target service.

It can be seen that, with adoption of the solution, whether to select another system or another domain upon initiation of the target service may be determined by the terminal device according to its own capability information and/or an indication transmitted by the network side. In such a manner, the terminal device may determine its own behavior in combination with the capability of the terminal device and the indication information of a network, so that a processing behavior of the terminal device for the target service may be clearly learned if the network side does not support a voice service and also does not support fallback to another system.

Embodiment 4

Figure 4:
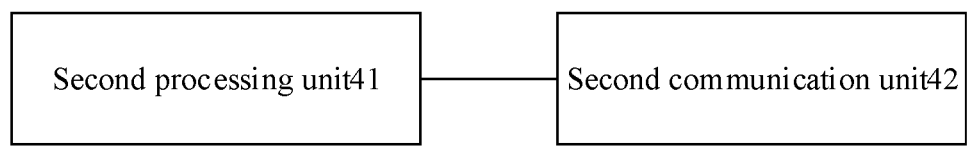
FIG. 4 is a composition structure diagram of a network device according to an embodiment of the disclosure.

The embodiment of the disclosure provides a network device, which, as shown in FIG. 4, includes a second processing unit 41 and a second communication unit 42.

The second processing unit 41 is configured to, when a terminal device resides in an NR network, transmit indication information to the terminal device through the second communication unit.

The second communication unit 42 is configured to send the indication information to the terminal device.

Specifically, the capability information is at least used for indicating whether the terminal device supports fallback to another system or another domain.

The indication transmitted by the network side includes an indication for indicating whether the network side supports the target service or an indication for indicating whether the network side supports fallback of the target service.

The other system is at least one system except the NR network. For example, it may be another system network such as an LTE network and a 5G, 4G or 3G network. Exhaustions are omitted herein.

The other domain is a domain different from a domain presently used by the terminal device and includes a CS domain or a PS domain.

It is also to be understood that the domain presently used by the terminal device may be one of the CS domain or the PS domain and, correspondingly, the other domain is the other domain except the presently used domain. That is, the above processing further includes that a subsequent operation is executed when the terminal device resides in the NR system and selects a target domain.

Furthermore, before the operation that the indication is transmitted to the terminal device, the method further includes the following operation.

The capability information of the terminal device is received, the capability information being at least configured to indicate whether the terminal device supports the capability of fallback to another system or another domain.

The operation that whether to select another system or another domain to initiate the service request for the target service upon initiation of the target service is determined based on the capability information reported to the network side and/or based on the indication transmitted by the network side may include the following multiple implementation scenarios.

A First Scenario

When a terminal device resides in an NR network, the terminal device reports capability information indicating that fallback to another system is not supported to a network side; after the network side receives the capability information of the terminal, the network side sends indication indicating that another system or another domain may be directly selected by the terminal device to initiate a target service to the terminal device; and when the terminal device requires to initiate the related target service, the terminal device selects the another system or another domain to initiate a service request for the target service.

A Second Scenario

When the terminal resides in the NR network, if the terminal device notifies the network side that it supports fallback to another system or another domain but the indication transmitted by the network side represents that the network side does not support fallback to the another system or the another domain, the terminal device selects the another system or the another domain to initiate the service request for the target service.

Or, when the terminal resides in the NR network, if the terminal device notifies the network side that it supports fallback to another system or another domain but does not receive indication transmitted by the network side, the terminal device selects the another system or the another domain to initiate the service request for the target service.

A Third Scenario

When the terminal resides in the NR network, if the terminal does not receive an indication about that the service is supported or the indication for indicating that fallback of the service is supported from the network, when the related service is required to be initiated, the terminal device selects another system or another domain is selected to initiate the service request.

A Fourth Scenario

When a terminal device resides in an NR network, the terminal device reports capability information indicating that fallback to another system is supported to a network side; when the network side does not support fallback to the another system, the terminal device receives indication for indicating that the another system or another domain may be directly selected by the terminal device to initiate a service from the network side; and when the terminal device receives the indication sent by the network side and needs to initiate the related service, the terminal device selects the another system or another domain to initiate a service request.

A Fifth Scenario

When the terminal resides in the NR network, if the terminal receives the indication for indicating that fallback of the service is supported from the network, but the terminal may not understand the indication or the terminal does not support fallback of the service to another network or another system, when the related service is required to be initiated, the terminal device selects the another system or another domain to initiate the service request.

Or, when the terminal resides in the NR network, if the indication received by the terminal from the network represents that the network does not support fallback of the target service to another system or another domain, the terminal device selects the other system or the other domain to initiate the service request for the target service.

It can be seen that, with adoption of the solution, whether to select another system or another domain upon initiation of the target service may be determined by the terminal device according to its own capability information and/or an indication transmitted by the network side. In such a manner, the terminal device may determine its own behavior in combination with its own capability and the indication information of a network, so that a processing behavior of the terminal device for the target service may be clearly learned if the network side does not support a voice service and also does not support fallback to another system.

Figure 5:
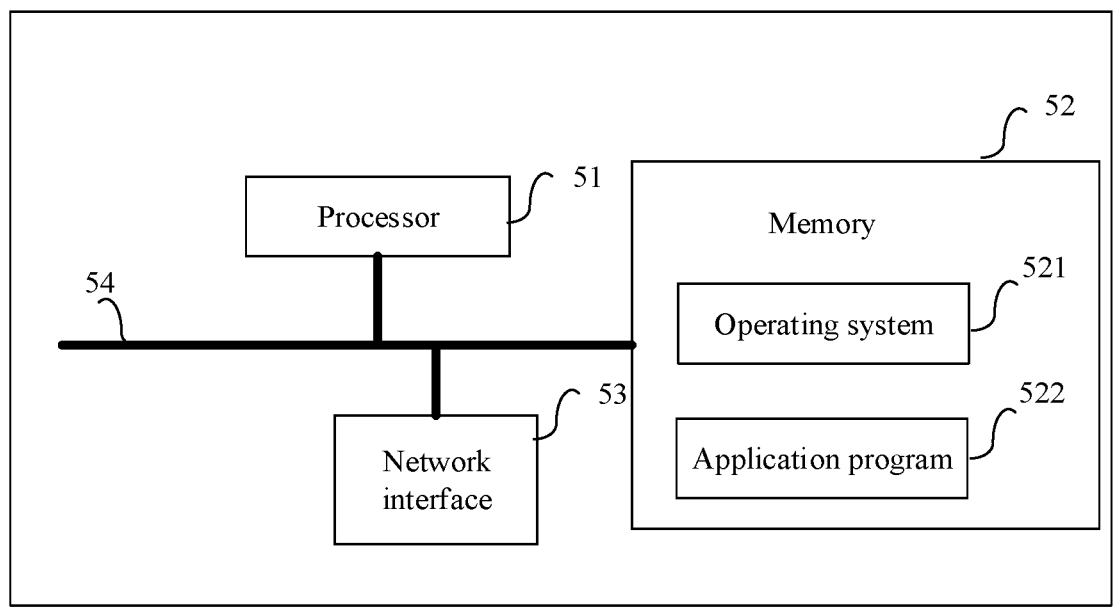
FIG. 5 is a schematic diagram of a hardware architecture according to an embodiment of the disclosure.

An embodiment of the disclosure also provides a hardware composition architecture of a terminal device or a network device, which, as shown in FIG. 5, includes at least one processor 51, a memory 52 and at least one network interface 53. Each component is coupled together through a bus system 54. It can be understood that the bus system 54 is configured to implement connection and communication between these components. The bus system 54 includes a data bus and further includes a power bus, a control bus and a state signal bus. However, for clear description, various buses in FIG. 5 are marked as the bus system 54.

It can be understood that the memory 52 in the embodiment of the disclosure may be a volatile memory or a nonvolatile memory, or may include both the volatile and nonvolatile memories.

In some implementation modes, the memory 52 stores the following elements, executable modules or data structures, or a subset thereof or an extended set thereof: an operating system 521 and an application program 522.

Herein, the processor 51 is configured to be capable of processing the steps of the method in embodiment 1 or 2, which will not be elaborated herein.

An embodiment of the disclosure provides a computer storage medium, which stores computer-executable instructions, the computer-executable instructions being executed to implement the steps of the method in embodiment 1 or 2.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A service-based processing method, the method applied to a terminal device and comprising:
    when the terminal device resides in a New Radio (NR) network, determining, by the terminal device, whether to select another domain to initiate a target service, based on indication transmitted by a network side,
    wherein determining, by the terminal device, whether to select the another domain to initiate the target service, based on the indication transmitted by the network side comprises:
    selecting, by the terminal device, the another domain to initiate the target service, when indication for indicating that the network side supports fallback of the target service to the another domain is not received from the network side, or indication for indicating that the network side supports the target service is not received from the network side,
    the method further comprising:
    reporting, by the terminal device, capability information to the network side, wherein the capability information at least indicates whether the terminal device supports fallback to the another domain; and
    determining, by the terminal device, whether to select the another domain to initiate the target service, based on the capability information reported to the network side and the indication transmitted by the network side.

2. The method of claim 1, wherein
    the indication transmitted by the network side comprises an indication for indicating whether the network side supports the target service or an indication for indicating whether the network side supports fallback of the target service to the another domain;
    the another domain is a domain different from a present domain used by the terminal device, and the another domain comprises a Circuit Switched (CS) domain or a Packet Switched (PS) domain; and the target service comprises an emergency service.

3. The method of claim 1 wherein determining whether to select the another domain to initiate the target service, based on the capability information reported to the network side and the indication transmitted by the network side comprises:

selecting, by the terminal device, the another domain to initiate the target service, when the capability information of the terminal device indicates that the terminal device supports fallback to the another domain, and the indication transmitted by the network side indicates that the network side does not support fallback of the target service to the another domain, or the indication transmitted by the network side is not received.

4. The method of claim 1, wherein determining whether to select the another domain to initiate the target service, based on the capability information reported to the network side and the indication transmitted by the network side comprises:

selecting, by the terminal device, the another domain to initiate the service request for the target service, when the capability information of the terminal device indicates that the terminal device supports fallback to the another domain, and if indication for instructing the terminal device to directly select the another domain to initiate the target service is received from the network side.

5. The method of claim 1, wherein, by the terminal device, determining whether to select the another domain to initiate the target service, based on the indication transmitted by the network side further comprises:

selecting, by the terminal device, the another domain to initiate the target service, when the indication transmitted by the network side is received, and if the terminal device is incapable of parsing the indication.

6. The method of claim 1, wherein determining whether to select the another domain to initiate the target service based on the indication transmitted by the network side further comprises:

selecting, by the terminal device, the another domain to initiate the target service, when the indication for indicating that the network side supports fallback of the target service is received from the network side, and if the terminal device is incapable of parsing the indication or the terminal device does not support fallback of the target service to the another domain.

7. A terminal device, comprising: a processor, and a memory configured to store instruction executable by the processor, wherein the processor is configured to:

receive indication transmitted by a network side;

when the terminal device resides in a New Radio (NR) network, determine whether to select another domain to initiate a target service, based on the indication transmitted by the network side, wherein the processor is further configured to:

select the another domain to initiate the target service, when indication for indicating that the network side supports fallback of the target service to the another domain is not received from the network side, or indication for indicating that the network side supports the target service is not received from the network side, wherein the processor is further configured to:

report capability information to the network side, wherein the capability information at least indicates whether the terminal device supports fallback to the another domain; and determine whether to select the another domain to initiate the target service, based on the capability information reported to the network side and the indication transmitted by the network side.

8. The terminal device of claim 7, wherein the indication transmitted by the network side comprises an indication for indicating whether the network side supports the target service or an indication for indicating whether the network side supports fallback of the target service to the another domain;

the another domain is a domain different from a present domain used by the terminal device, and the another domain comprises a Circuit Switched (CS) domain or a Packet Switched (PS) domain; and the target service comprises an emergency service.

9. The terminal device of claim 7, wherein the processor is configured to:

select the another domain to initiate the target service, when the capability information of the terminal device indicates that the terminal device supports fallback to the another domain, and the indication transmitted by the network side indicates that the network side does not support fallback of the target service to the another domain, or the indication transmitted by the network side is not received.

10. The terminal device of claim 7, wherein the processor is configured to:

select the another domain to initiate the target service, when the capability information reported to the network side indicates that the terminal device supports fallback to the another domain, and if indication for instructing the terminal device to directly select the another domain to initiate the target service is received from the network side.

11. The terminal device of claim 7, wherein the processor is further configured to:

select the another domain to initiate the target service, when the indication transmitted by the network side is received, and if the terminal device is incapable of parsing the indication.

12. The terminal device of claim 7, wherein the processor is further configured to:

select the another domain to initiate the target service, when the indication transmitted by the network side for indicating that the network side supports fallback of the target service is received, and if the terminal device is incapable of parsing the indication or the terminal device does not support fallback of the service to the another domain.

13. A network device, comprising:

a network interface, a processor, and a memory, wherein the network interface, the processor and the memory are connected though a system bus, the memory is configured to store instruction executable by the processor, and the processor is configured to:

when a terminal device resides in a New Radio (NR) network, transmit indication to the terminal device through the network interface, to enable the terminal device to select another domain to initiate a target service, wherein the terminal device selects the another domain to initiate the target service when indication for indicating that the network side supports fallback of the target service to the another domain is not received from the network side, or indication for indicating that the network side supports the target service is not received from the network side, wherein the network interface is configured to receive capability information of the terminal device, the capability information indicating whether the terminal device supports fallback to the another domain.

14. The network device of claim 13, wherein the indication transmitted by the network device comprises an indication for indicating whether the network device supports the target service or an indication for indicating whether the network device supports fallback of the target service to the another domain;

the another domain is a domain different from a present domain used by the terminal device, and the another domain comprises a Circuit Switched (CS) domain or a Packet Switched (PS) domain; and the target service comprises an emergency service.

15. The terminal device of claim 7, wherein the processor is configured to:

select the another domain to initiate the target service, when the capability information of the terminal device indicates that the terminal device does not support fallback to the another domain, and the indication transmitted by the network side indicates that the network side supports fallback of the target service to the another domain.

16. The method of claim 1, wherein determining, by the terminal device, whether to select the another domain to initiate the target service, based on the capability information reported to the network side and the indication transmitted by the network side comprises:

selecting, by the terminal device, the another domain to initiate the target service, when the capability information of the terminal device indicates that the terminal device does not support fallback to the another domain, and the indication transmitted by the network side indicates that the network side supports fallback of the target service to the another domain.

* * * * *